United States Patent [19]

Rupert

[11] Patent Number: 4,818,834

[45] Date of Patent: Apr. 4, 1989

[54] PROCESS FOR DRILLING CHAMFERED HOLES

[75] Inventor: Gary F. Rupert, Ann Arbor, Mich.

[73] Assignee: Raycon Corporation, Ann Arbor, Mich.

[21] Appl. No.: 171,040

[22] Filed: Mar. 21, 1988

[51] Int. Cl.$^4$ ............... B23H 1/00; B23H 5/02; B23H 9/14; B23K 26/00
[52] U.S. Cl. ............... 219/69.17; 204/129.3; 204/129.35; 204/129.55; 219/121.71
[58] Field of Search .......... 204/129.3, 129.35, 129.55; 219/69 M, 69 RS, 121.6, 121 LL

[56] References Cited

U.S. PATENT DOCUMENTS

| | | | |
|---|---|---|---|
| 3,431,389 | 3/1969 | Tudor et al. | 219/69 M |
| 3,816,272 | 6/1974 | Joslin | 204/129.35 X |
| 4,045,311 | 8/1977 | Matsui et al. | 204/129.35 X |
| 4,283,259 | 8/1981 | Melcher et al. | 204/129.55 X |

FOREIGN PATENT DOCUMENTS 0959178 9/1982 U.S.S.R. .............. 204/129.35

Primary Examiner—Donald R. Valentine
Attorney, Agent, or Firm—John C. Evans

[57] ABSTRACT

A process for drilling chamfered holes includes the steps of directing noncontact energy onto the outer surface of the part to form a recessed crater-like entrance with chamfered walls and thereafter directing a small diameter wire electrode adjacent the substrate and spark eroding the base without removing material from the chamfered walls so as to produce a combined passage through the part with a chamfered entrance leading to a smaller outlet. In one embodiment the part has a ceramic coating which is initially removed from the part by either focusing a laser beam to a penetration depth which removes the ceramic coating while forming the entrance and in another embodiment the coating is initially removed by imposing a high voltage pulse thereagainst from a spark erosion electrode of electrical discharge machining equipment.

4 Claims, 2 Drawing Sheets

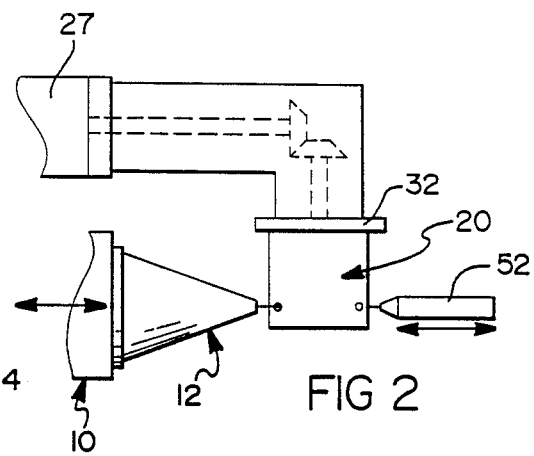
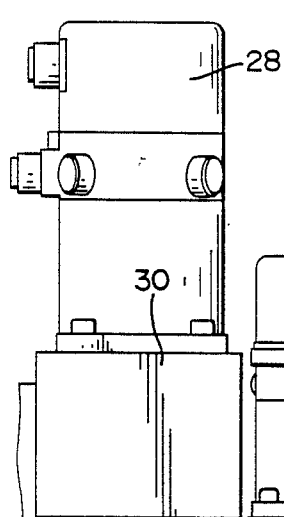
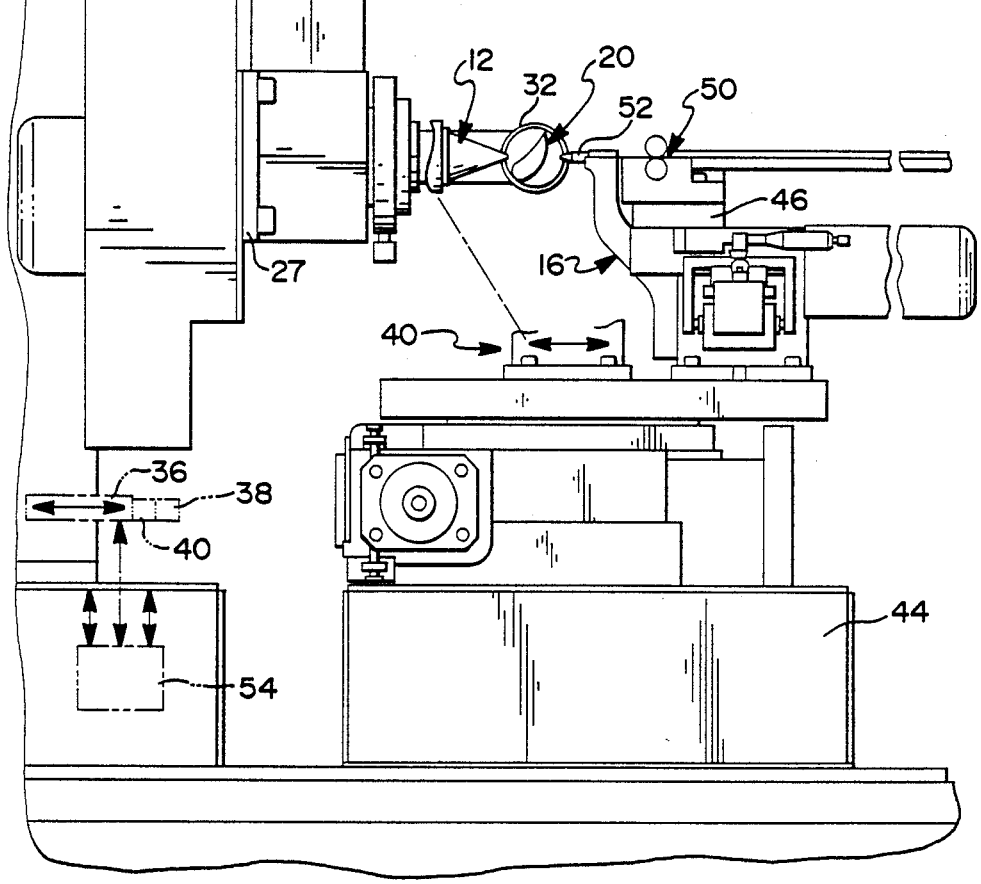

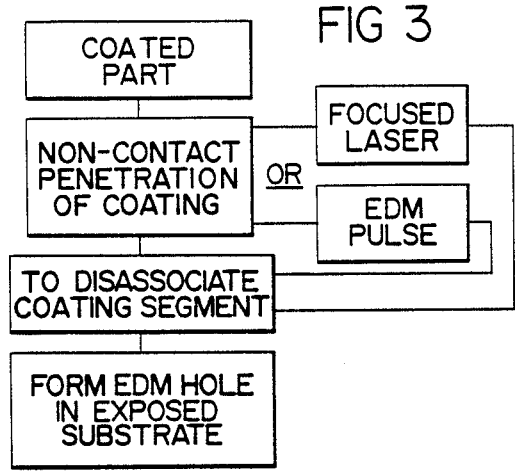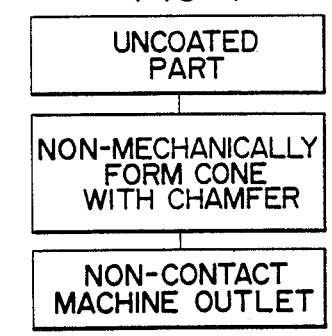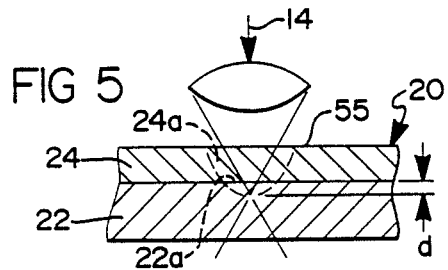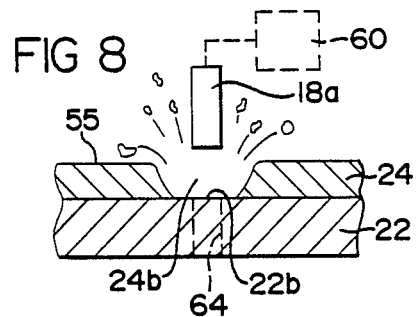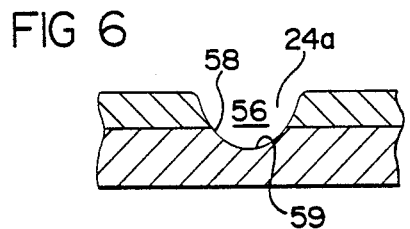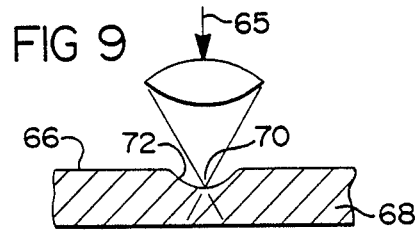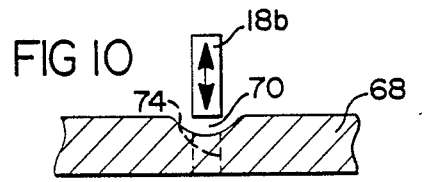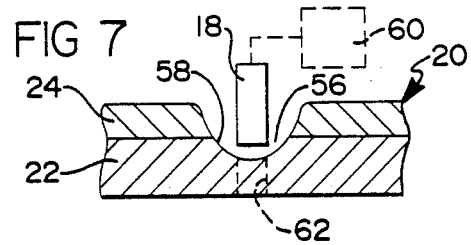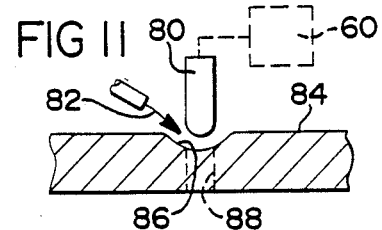

PROCESS FOR DRILLING CHAMFERED HOLES

TECHNICAL FIELD

The present invention relates generally to precision drilling processes and more particularly to drilling processes including use of noncontact energy sources to form holes in parts without mechanically disassociating material therefrom.

BACKGROUND ART

U.S. Pat. No. 4,504,727 sets forth a laser drilling system which utilizes photoacoustic feedback to monitor and control the laser beam so as to control a laser drilling process. In the -727 patent, the drilling process is provided to produce an array of holes in a multilayered printed circuit board. In such arrangements, it is necessary to closely control the pulse power of a laser so that it can be adjusted for each successive layer in such structures. There is no suggestion in the -727 patent that the laser formed hole be later precision finished to a close tolerance suitable for use in parts requiring precision small diameter holes.

U.S. Pat. No. 3,696,504, issued Oct. 10, 1972, discloses a process wherein a laser beam is used to form a hole through a part. In the case of metal parts it is recognized that such laser formed holes can effect the metallurgy of the parts. In accordance with the process of the -504 patent, the altered metallurgy of the laser formed hole is subsequently machined away by a mechanical tool having a blade which reams the wall of the laser formed hole.

In copending U.S. application Ser. No. 060,826 filed June 12, 1987, with a common assignee, a drilling process is disclosed in which undersized holes are first formed by a laser to reduce the cycle time for penetration of the hole through the part. The part is then finished by electrical discharge machining. Specifically, a wire electrode of an electrical discharge machine is advanced through the previously laser formed undersized hole which is sized to provide an annular flow path for unidirectional flow of electrolyte during an EDM process. The flow path is sized so that particles produced during the EDM process will be flushed from the part by the unidirectional flow of electrolyte. The wire electrode is sized and is connected to a pulse generator to control energy at a spark gap between the wire electrode and a grounded workpiece so as to form a hole of precision dimension and with a microfinished surface thereon. The use of a laser to form a rough undersized hole, followed by a precision finishing of the laser hole by electrically discharge machining the inner surface thereof reduces the total hole forming cycle time as compared to the cycle time of prior computer controlled EDM hole drilling equipment. Furthermore, the combination of laser drilling of undersized holes and EDM finishing enables nozzle parts to be produced at high production rates while maintaining hole size precision and finish.

None of the aforedescribed methods discuss how to penetrate a part having a ceramic coating. Furthermore, none of the methods discuss the formation of holes having a chamfer at the entrance.

SUMMARY OF THE INVENTION

A general object of the present invention includes the process of using either laser energy or a high voltage pulse from an EDM electrode to drill a hole in a ceramic coated part by disassociating a segment of the ceramic coating from a substrate so that the substrate can be partially exposed for finishing a hole therein by use of EDM spark erosion.

Another object of the present invention is to form a part to have a lead chamfer in a hole by use of noncontact energy and without mechanical machining of the part.

Another object of the present invention is to drill a hole in a part by a process in which a focused laser beam forms a chamfer in the surface of the part which forms an oversized entrance to a later formed spark eroded hole.

A feature of the present invention is to provide an improved process for drilling ceramic coated parts having an electrically conductive substrate by the provision of process steps including directing noncontact energy against the protective coating to disassociate a portion of the protective coating from the substrate so as to form a exposed surface on the substrate material; and spark eroding the exposed surface on the substrate material to form an opening through the substrate material having the inlet thereto bounded in part by the overlying protective coating.

A further feature of the present invention is to provide a process of the preceding paragraph wherein the protective coating is disassociated from the substrate by focusing a laser beam on the outer surface of the protective coating.

Another feature of the present invention is to provide a process for removing a protective coating from an electrically conductive substrate later spark eroded to form a hole therein including the step of disassociating the protective coating from the substrate by applying a voltage pulse from a spark erosion electrode against the outer surface of the protective coating for generating a breakthrough pressure in the protective coating for disassociating a segment of the coating from the substrate.

Another feature of the present invention is to improve such drilling processes by applying a laser beam against the outer surface of the protective coating to penetrate it and a portion of the depth of the substrate to form a chamfered entrance in the substrate material; and spark eroding a hole from the chamfered entrance through the remainder of the depth of the substrate for forming a two stage passage through the substrate with a chamfer from the outer surface of the coated part to the spark eroded hole therethrough.

A further feature of the present invention is to provide a chamfered entrance of the type set forth in the preceding paragraph by focusing a beam of noncontact energy on the outer surface of the part to form a cone configured recess therein with an inlet chamfer; spark eroding the part from the base of the recess to form a smaller area cross-sectioned opening through the remaining depth of the part to form a combined passage through the part with a chamfer leading to a smaller outlet.

Still another feature is to improve hole drilling processes by imposing noncontact energy against the outer surface of an uncoated electrically conductive part to penetrate only a portion of the depth of the part and maintaining the noncontact energy on the part to form a cone configured recess therein defining a chamfered entrance; and directing a wire electrode into the chamfered entrance without spark eroding the walls of the chamfered entrance and spark eroding the base of the recess to form an undersized outlet from the recess.

Other objects, features and advantages of the present invention will become more apparent from the following description take in conjunction with the accompanying drawings.

BRIEF DESCRIPTION OF THE DRAWINGS

FIGS. 1 and 2 are side and top elevational views, respectively, of a machine used in the practice of the process of the present invention;

FIG. 3 is a chart of one embodiment of a process of the present invention;

FIG. 4 is a chart of another embodiment of a process of the present invention;

FIG. 5 is a diagrammatic view of a ceramic coated part processed by the invention of FIG. 3;

FIG. 6 is an enlarged fragmentary sectional view of a cratered part formed by use of one alternative in the process of FIG. 3;

FIG. 7 is a diagrammatic view of an EDM hole forming step to finish the part in FIG. 6;

FIG. 8 is a diagrammatic view of a ceramic coated part processed by another embodiment of the process of FIG. 3;

FIGS. 9 and 10 are diagrammatic views of a part processed by the method of FIG. 4; and FIG. 11 is an enlarged sectional view of a part formed by practicing another embodiment of the method of FIG. 4.

DETAILED DESCRIPTION OF THE INVENTION

Referring now to FIG. 1, a laser hole drilling station 10 is illustrated. It includes a laser head 12 for producing a laser output beam 14. Station 10 is angularly offset with respect to an EDM hole drilling station 16 having a wire electrode 18. While the energy source is shown as a laser, other high energy noncontact sources such as high energy electron beams are applicable, depending on the kinds of workpiece being processed.

The workpiece 20, for example, can be a ceramic coated blade having an electrically conductive metal substrate 22 and a protective coating 24 of dielectric material, for example, a temperature resistant ceramic material.

In the machine cell of FIG. 1, the workpiece is supported by an indexing platform 26 for movement with respect to the various work stations. The indexing platform more particularly includes a carriage 27 connected to a drive motor 28 and suitable drive gear means 30 to drive carriage 27 into a plurality of vertically displaced locations to locate the workpiece 20 at the work stations. The workpiece 20 is located on a rotatable plate 32 on the platform 26. The plate 32 is driven by an actuator 34 to position it in a plurality of hole forming indexed positions. Cross-slide 36 supports the platform 26. It is driven by motor 38 and drive gear 40 to position the workpiece 20 at the laser head 12 and the EDM station 16.

The EDM drilling station 16 includes a base 44 with a carriage 46 for feeding a wire electrode 18 for finish machining laser formed chamfers in the workpiece during a precision machining operation of the hole drilling system 10. Specifically, the wire electrode passes through a refeed mechanism 50 and a wire guide 52 to the workpiece 20. The refeed mechanism 50 is adapted to advance the electrode wire relative to the carriage 46 upon retraction of the carriage after each machining operation.

An operating sequence of the cell includes moving the carriage 27 to the laser hole drilling station 12 and to the EDM hole drilling station 16. The machine is controlled by a CNC controller 54 at each such station to position the workpiece 20 in a preprogrammed sequence at each station to form a desired series of holes therein shaped in accordance with the present invention.

Ceramic coated parts such as gas turbine engine blades can advantageously include passages therethrough. In the past it has been necessary to provide expensive mechanical machining of such ceramic coatings or to cast the holes in such ceramic coatings at considerable cost and expenditure of time. Such coatings, in themselves, are dielectric materials which resist spark erosion machining by preventing the formation of a spark gap between the electrode and the part.

The present invention includes the first step of focusing noncontact energy against the outer surface of the workpiece 20 to break through the outer nonconductive coating 24 and expose the conductive substrate 22.

In the process of FIG. 3, the laser beam 14 is focused to a depth d as shown in FIG. 5. The beam 12 thereby penetrates the full depth of the ceramic coating 24 and a part of the depth of the substrate 22. The focused laser beam is held on the part to cause a segment 24a of the ceramic coating 24 to be disassociated from the surface of the substrate 22. The vehicle for disassociation will depend upon the coating composition and may include melting, vaporization or particle separation. In any case, a portion 22a of the substrate 22 is exposed for a subsequent spark erosion of the workpiece by the wire electrode 18.

In one case, the noncontact energy is a laser beam. The laser beam is focused to a depth d and the laser energy input to the workpiece 20 is controlled at a level to form a crater 56 with chamfered walls 58 and a bottom surface 59 in substrate 22 (FIG. 6).

The workpiece 20 is then positioned (FIG. 7) to locate a wire electrode 18 concentrically of the crater 56. The wire electrode 18 is then advanced through the substrate 22 while pulsing current thereto from an EDM power generator 60. The electrode 18 is sized so that it will not spark erode the chamfered walls 58 while forming an outlet passage 62 from the crater 56.

As shown in FIG. 8, another alternative process of the FIG. 3 invention is substituted for mechanical drilling of the ceramic coating. The alternative includes use of a wire electrode 18a of the EDM station to penetrate coating 24. The electrode 18a is located in close proximity to the surface 55 of the coating 24. A high voltage pulse from power generator 60 is applied by the electrode 18a to substrate 22. The voltage pulse is selected to cause noncontact disassociation of the ceramic coating 24 to separate a portion 24b thereof from the electrically conductive substrate 22 so as to form an exposed surface 22b on the substrate material In this case, a resultant passage in substrate 22 has a cross-section corresponding to that of the wire electrode 18a which advances to spark erode the exposed surface 22b of the substrate material to form an opening 64 therethrough (shown in broken line outline in FIG. 8).

The embodiment of the process of the present invention shown in the FIG. 4 chart provides a passage in an electrically conductive, uncoated part. In this process either a laser beam 65 or an electron beam pulse from a suitable power generator is focused on the outer surface 66 of a part 68 as shown in FIG. 9. The focused noncontact energy forms a cone configured recess 70 with chamfered walls 72 in the part 68. In one application, the part can be a suture needle having an enlarged head portion with a through hole to receive the stitching filament. In order to avoid filament wear, it is desirable to form a chamfered lead through the enlarged portion as by use of the laser beam 65.

Thereafter an energized electrode 18b is then advanced with respect to the part 68 as shown in FIG. 10 to spark erode the part 68 without eroding the walls of the recess 70. The spark erosion forms an opening 74 through the remaining depth of the part to form a combined passage through the part with a chamfered entrance leading to an outlet.

FIG. 11 shows another embodiment in which a spark erosion electrode 80 is associated with a salt solution electrolyte stream 82. The stream 82 is directed into the spark gap on a substrate surface 84 to induce an enhanced erosion effect. The enhanced erosion forms a chamfer 86 in the surface 84. Once the chamfer 86 is formed, the high strength salt solution is diluted and the spark erosion process continues to form a smaller dimension through passage 88.

Although the description of this invention has been given with reference to a particular embodiment, it is not to be construed in a limiting sense. Many variations and modifications will be apparent to those skilled in the art. For a definition of the invention, reference is made to the appended claims.

What is claimed is:

1. A process for drilling an electrically conductive metal substrate having an overlying protective ceramic coating of a composition which resists spark erosion machining by preventing the formation of a spark at a gap between an EDM powered electrode and a metal workpiece the steps comprising:

directing noncontact energy against the protective ceramic coating to disassociate a portion of the protective ceramic coating from the substrate so as to form an exposed surface on the metal substrate;

aligning an EDM powered electrode tip in spaced relationship to the exposed surface to form a spark gap between the exposed surface and the electrode tip;

applying current from the tip to the surface to form a spark across the gap for spark eroding the metal substrate from the exposed surface to form an opening through the metal substrate having the inlet thereto bounded in part by the overlying protective ceramic coating.

2. In the process of claim 1, disassociating the protective ceramic coating from the substrate by focusing a laser beam on the outer surface of the protective coating.

3. In the process of claim 1, applying a voltage pulse from a spark erosion electrode against the outer surface of the protective ceramic coating having a voltage level capable of penetrating to the conductive substrate for generating a break out pressure in the protective ceramic coating for disassociating it from the substrate.

4. In the process of claim 1, applying a laser beam against the outer surface of the protective ceramic coating to penetrate it and a portion of the depth of the substrate to form a chamfered entrance in the substrate material;

spark eroding a hole from the chamfered entrance through the remainder of the depth of the substrate for forming a two stage passage through the substrate from the outer surface of the coated part of the spark eroded hole therethrough.

* * * * *